Figure 1:
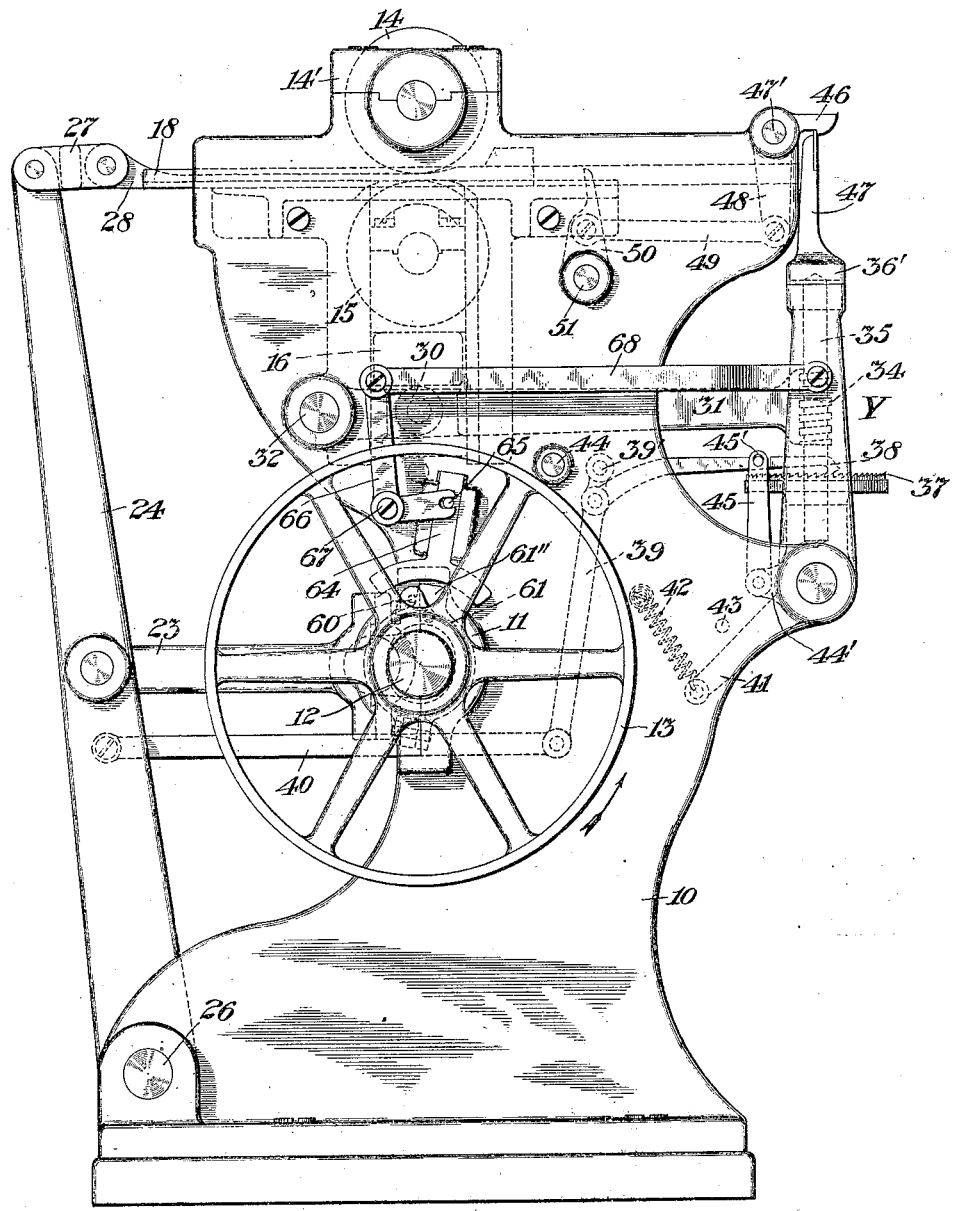

F. H. RICHARDS.
BAR LENGTHENING MACHINE.
APPLICATION FILED APR. 9, 1900.

922,512.

Patented May 25, 1909.
6 SHEETS—SHEET 1.

Witnesses:

Inventor.

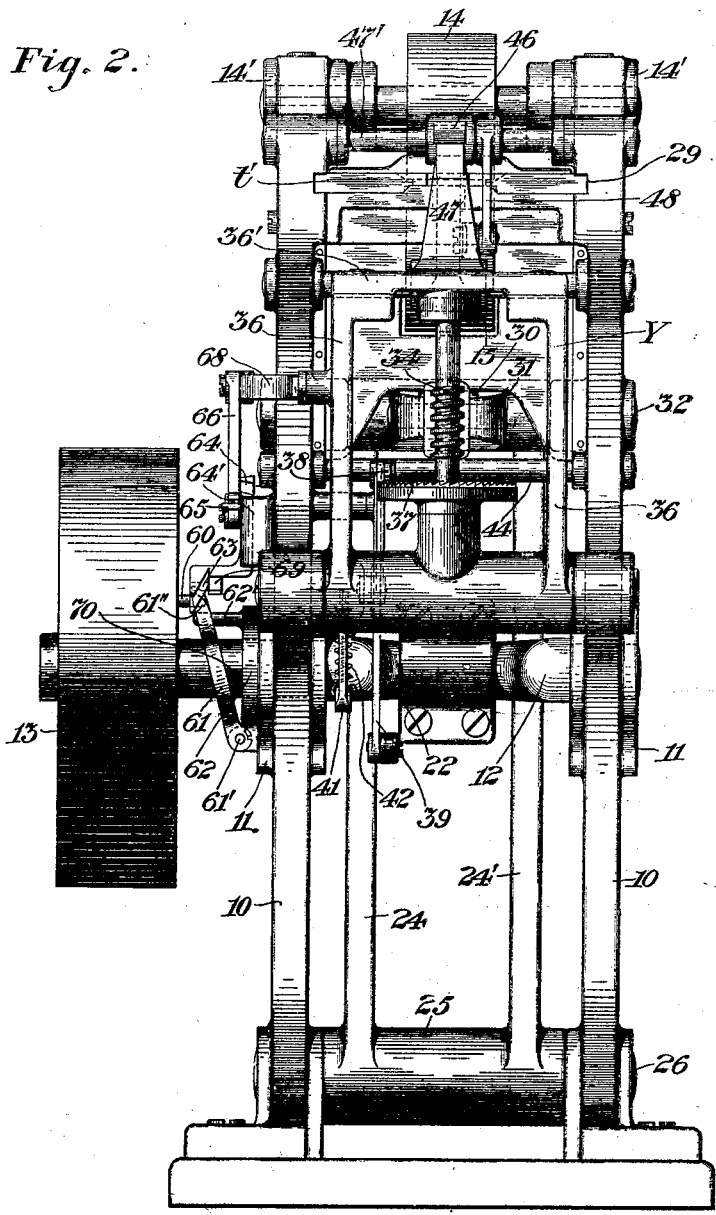

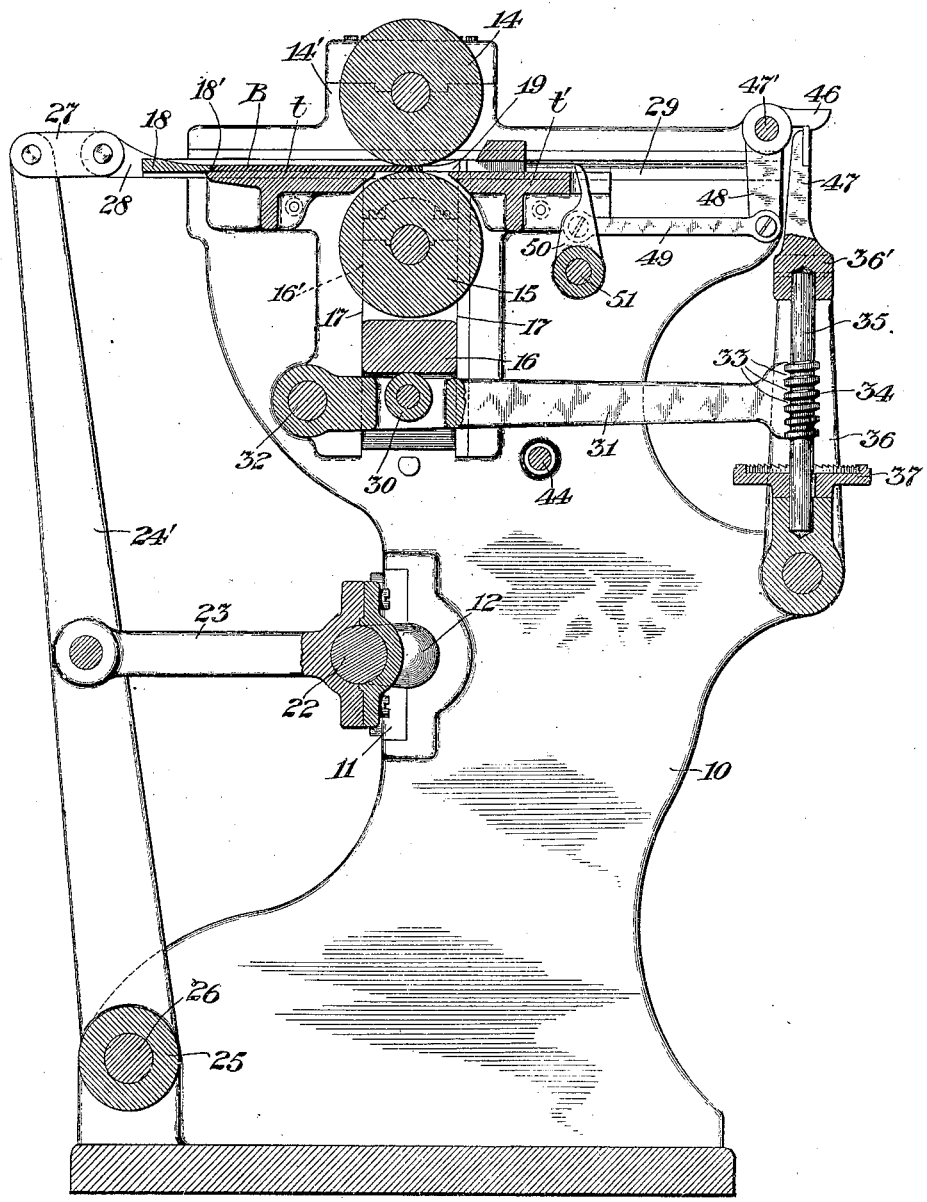

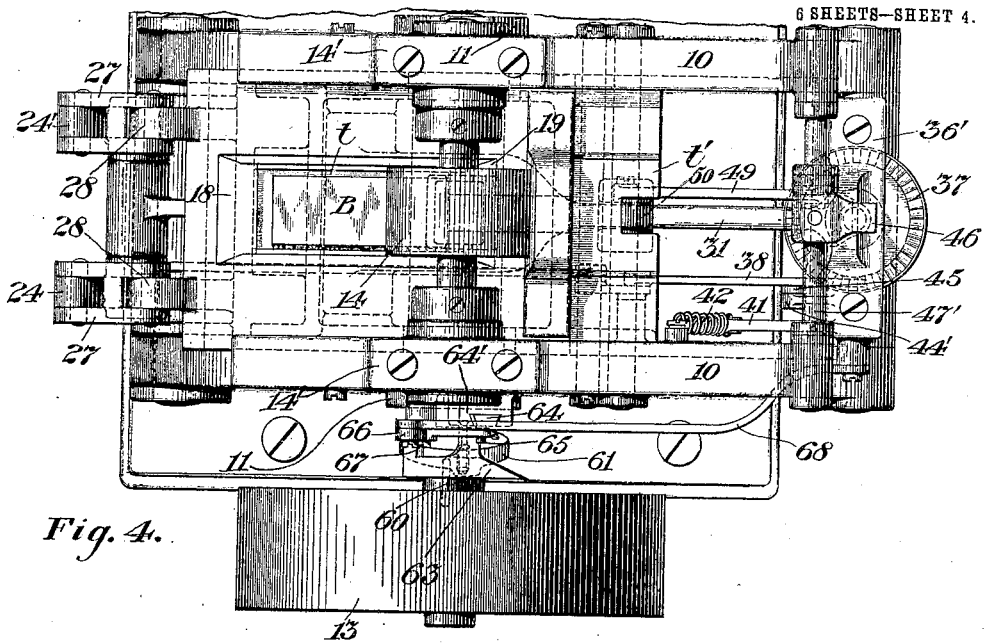

F. H. RICHARDS.
BAR LENGTHENING MACHINE.
APPLICATION FILED APR. 9, 1900.

922,512.

Patented May 25, 1909.
6 SHEETS—SHEET 5.

Witnesses:

Inventor:

F. H. RICHARDS.
BAR LENGTHENING MACHINE.
APPLICATION FILED APR. 9, 1900.

922,512.

Patented May 25, 1909.
6 SHEETS—SHEET 6.

Witnesses.

Inventor.

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

BAR-LENGTHENING MACHINE.

No. 922,512.             Specification of Letters Patent.             Patented May 25, 1909.

Application filed April 9, 1900. Serial No. 12,164.

*To all whom it may concern:*

Be it known that I, FRANCIS H. RICHARDS, a citizen of the United States, residing at Hartford, in the county of Hartford and State of Connecticut, have invented certain new and useful Improvements in Bar-Lengthening Machines, of which the following is a specification.

This invention relates especially to bar-lengthening or standardizing mechanism, and is embodied in a machine for increasing one dimension of an object or member having a size less than a predetermined standard, it having for its main object to provide a mechanism for effecting the extension of such objects or members by subjecting the same to compression, such compression being effective to reduce the cross-section of the object and thus elongate the latter.

My invention has more particularly for its object to provide a simple and effective mechanism for securing the justification or proper spacing of a plurality of separate types forming the types of a type-bar, this justification being accomplished by effecting a substantially uniform reduction in the thickness of the body of the bar throughout its length, this reduction resulting in the elongation of the bar from a normal unjustified length to a standard justified length corresponding to the width of a given column of matter that it may be desired to compose.

In the manufacture of typebars which embody a series of types or characters along their edge and where no provision for justification exists either during or after the formation of the word groups, the resultant bars usually vary in length. In order to bring the individual bars whose respective lengths are equal to the lengths of the corresponding lines of unjustified but separated types, to a predetermined length, I elongate them, in carrying out my present improvements, to a greater or less extent, varying with the amount each individual typebar falls short of the required length.

A machine built in accordance with my invention includes means for elongating a bar by reducing the cross-sectional area thereof, in a substantially uniform manner, throughout its length. The amount of such reduction will in some cases be less than for others, while the reducing operation is stopped as soon as the bar has acquired the necessary length.

The reduction of the cross-section of an unjustified typebar, for the purpose of elongating the latter to a predetermined standard length, may be effected in various ways, but I prefer to reduce the cross-section of such a bar by subjecting the body portion thereof to a substantially uniform compression throughout its length. As this result can be accomplished best by rolling, a machine forming the subject-matter of the present application of the invention includes, in its preferred form, one or more reducing-rollers operative progressively along the entire length of the bar and effecting the reduction of the cross-section of the body portion thereof substantially to the same extent throughout.

A further feature of my improvement relates to means for limiting the dimensional increase of the object operated upon so that the altered bar shall conform to a determined standard, and in addition thereto a device may be provided for carrying said object beyond, and keeping the same out of contact with, the reducing members when the predetermined size has been reached.

My invention may be applied more especially in carrying out the art of manufacturing type-bars as described and claimed by me in a contemporaneously-pending application filed March 22, 1899, Serial No. 710,029, to which reference may be had.

Figure 6:
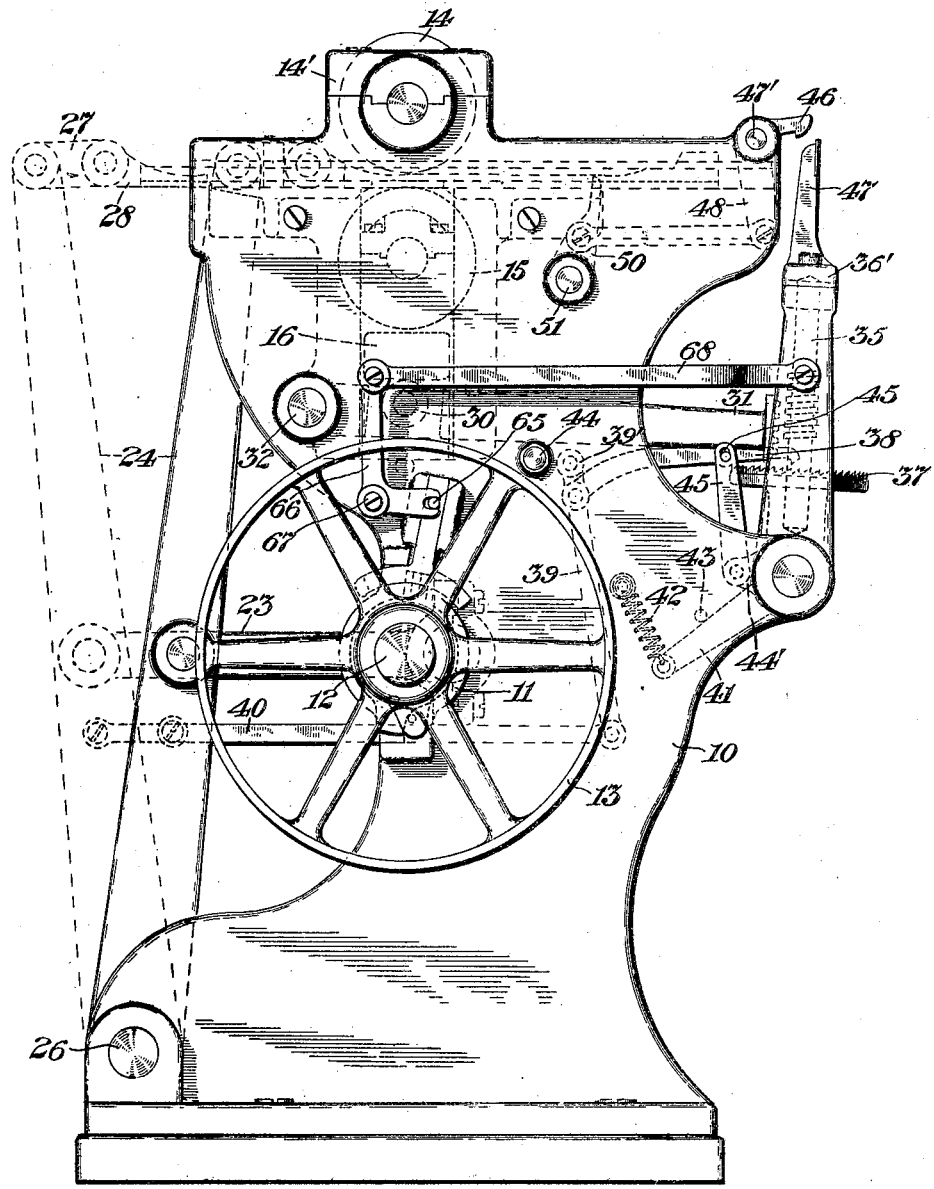
Figure 7:
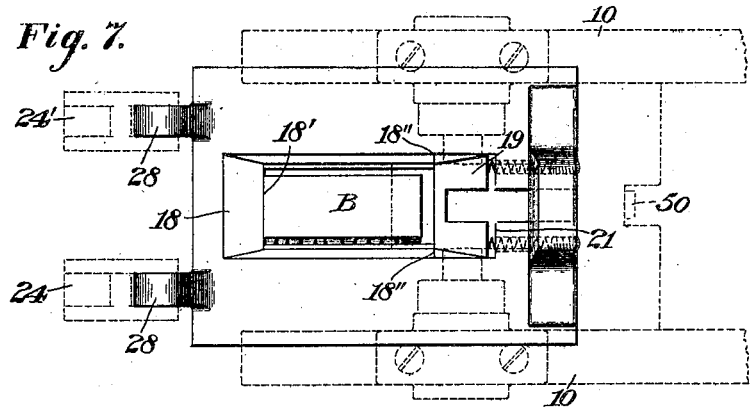
Figure 8:
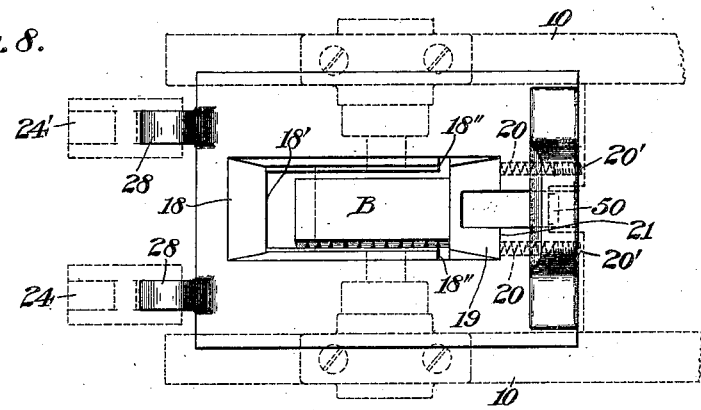
Figure 9:
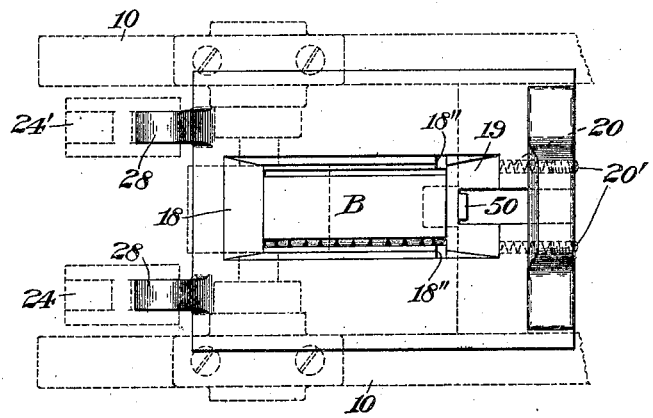

In the accompanying drawings, Figure 1 is a side view of a machine embodying my invention. Fig. 2 is an end view of the same, looking from the right in Fig. 1. Fig. 3 is a central longitudinal section. Fig. 4 shows a top view of the machine. Fig. 5 is a partial section similar to that shown in Fig. 3, some of the parts being in other positions. Fig. 6 is a side view showing the machine after some of the operative parts have been stopped. Figs. 7 to 9, inclusive, illustrate the positions of the bar-carrying member at different stages of the operation.

While it is evident that my invention may be adapted to machines of various constructions, I have shown in the drawings a mechanism that is automatic in action and has an automatic throw-out device for stopping the operation.

The machine illustrated in the drawings includes a pair of frames 10, having bearings 11, in which the main driving-shaft 12 is journaled. Rotary movement may be imparted to said shaft from any suitable source by a belt (not shown) driving a pulley 13, which is preferably provided with a clutch mechanism to disconnect said pulley from the shaft automatically when the reducing operation of the bar has been carried to the required extent.

As above mentioned means are provided for reducing the cross-section of a bar and thus elongating the latter, these means consisting, in the present instance, of a pair of coacting rollers 14—15, the former of which is journaled in bearings 14' near the top of the machine, while the latter, 15, may be journaled adjacent to its ends in bearings 16', formed on a vertically-movable yoke 16, which is guided in suitable ways 17 on the frame 10.

The bar to be rolled is passed between the rollers 14—15, the latter of which serves as a supporting means for the bar during the rolling operation, while it may be fed toward the former gradually and automatically, as will hereinafter appear. Stationary supporting-tables t—t' may be provided for preventing the bar from dropping out of the carrier described below.

The mechanism for passing a bar between the rollers 14—15 includes a carrier, such as 18, consisting substantially of a rectangular frame adapted for receiving a bar to be rolled and having a fixed stop-face 18', against which said bar may rest during the rolling operation, and which, in connection with a movable stop or follower, such as 19, may serve to limit the elongation of said bar to a predetermined standard length. This follower 19 is slidably held in the carrier and is normally forced inward and against side stop-faces 18'' by a pair of springs 20, (shown in dotted lines in Figs. 7 to 9, inclusive,) each of said springs being seated in a recess provided therefor in the carrier 18 and resting at one end against said follower and at the other end against a screw-threaded plug, such as 20', held in said carrier.

The outward movement of the follower 19, as it is gradually forced along in the carrier by the elongation of the bar, may be limited by a stop-face 21, formed on the carrier-frame. It will therefore be seen that when the follower has been pushed to the limit of its movement by the bar any further elongation of the latter will be prevented. Means are provided for stopping the rolling operation of the bar and consequently the elongation of the latter when the follower shall have reached the limit of its outward movement, this means, however, not being effective until the bar shall have completed its passage between the reducing-rollers for its entire length, so that the operation of reducing the bar substantially uniformly throughout will not be affected.

In the present instance inasmuch as the bar is passed between the reducing-rollers 14—15 by a movable carrier, I deem it expedient to make use of the movement of the carrier in connection with that of the independent bar-operated follower in the carrier for effecting the release of the roll-feeding means.

The movement of the carrier is of a predetermined amount and is preferably effected by a crank 22 on the shaft 12.

A suitable pitman, such as 23, serves to connect the crank 22 with a pair of vertically-disposed levers 24—24', connected at their lower ends by a sleeve 25, through which a fulcrum-pin 26 may be passed. At their upper ends the levers 24—24' carry links, such as 27, the other ends of which are pivotally secured to suitable ears 28, provided on the carrier 18. Hence it will be seen that a reciprocatory movement of uniform length will be imparted to the carrier in its ways 29, and that consequently the stop-face 18' of the carrier will assume a certain predetermined position at the end of each stroke of the carrier.

In the present instance the reducing-rollers 14—15 are rotated by contact with the bar as the latter is passed between them, and it is evident that when the carrier is moved from left to right, as seen in Figs. 3 and 7, the bar B will rest at one end against the stop-face 18' and as it is elongated by the reducing-rollers, during its passage between the latter, the other end of the bar will be gradually advanced toward the follower 19. This gradual advance of the right-hand end of the bar will continue until the follower has been pushed to the limit of its movement in the carrier—or, in other words, until the follower is brought to rest against the stop-face 21, above referred to, this position being shown in Fig. 9.

From the foregoing it will be seen that the elongation of the unjustified bar B to a standard or predetermined size results in gradually shifting the face 19' of the follower relatively to the carrier until the follower reaches the limit of its movement, when said face 19' becomes effective for releasing and throwing out of gear the means for feeding the reducing-rollers, and it may at the same time serve to stop the movement of the carrier in a manner hereinafter described.

The operation of elongating an unjustified bar of a length less than a predetermined standard is preferably carried on by subjecting the bar repeatedly to the action of the reducing members, and thus accomplishing repeated reductions, in such a manner that all danger of injuring or crushing the body of the bar by a sudden and excessive reduction may be avoided. For this reason the feed of the reducing members is relatively slight for each reciprocation of the bar-carrier, so that the reduction will take place gradually until the bar has been lengthened to the proper or predetermined extent, the number of individual feeds being, of course, proportionate to the original lengths of the several bars to be operated upon—in other words, short bars require to be subjected to a greater number of reductions or rollings than longer bars.
Various means may be employed for feeding one or both of the reducing-rollers, but I prefer to use a mechanism substantially as illustrated in the drawings, this mechanism including the yoke 16, above mentioned, carrying the lower reducing-roller 15. The nature of the work to be performed renders it desirable to impart a relatively slight feed movement to this roller, such feed preferably taking place during the return stroke of the carrier. The yoke 16 is preferably supported by a roll 30, carried on a lever 31, which is fulcrumed at 32 and is provided at its free end with a series of teeth 33, adapted to engage correspondingly-shaped screw-threads 34, formed on a spindle 35. This spindle may be journaled in a yoke Y, comprising a pair of arms 36 and a top brace 36', and suitable means are, in the present case, provided for imparting to said spindle an intermittent rotation for raising the free end of the lever 31, and hence the roll-supporting yoke 16. This means consists preferably of a ratchet-wheel, such as 37, mounted on said spindle, and the teeth of which may be engaged by a hook-pawl 38, which may be under the direct control of the carrier-operating lever 24, above referred to, said pawl being connected to one end of a lever 39, pivoted at one end, as at 39', while the other end of the lever is connected by a link 40 with said lever 24.

By referring to Fig. 1 it will be evident that the spindle is rotated to raise the lever 31 upon the movement of the carrier from right to left, as seen in that figure.

The yoke Y may be provided with an arm, such as 41, the free end of which is attached to spring 42 for urging said yoke into a position in which the screw-threads 34 are disengaged from the arm 31, a suitable stop 43 being provided to limit such movement, while a stop, such as 44, may serve to limit the downward movement of the arm 31 after it has been released from its operating member. At the same time that the yoke Y is swung back to release the arm as just described, the pawl 38 may be raised out of engagement with the ratchet-wheel 37, so that the rotation of the latter by the pawl is interrupted. Furthermore, said ratchet may be rotated by hand in either direction, the means for accomplishing this result consisting, in the present instance, of an arm 44', carried by the yoke Y and connected with the pawl 38 by a link 45, the upper end of which is slotted, as shown at 45', to permit said pawl to rise over the ratchet-teeth during the return stroke.

As previously stated the release of the feed mechanism is automatically effected by the bar when it has acquired its full and predetermined length, the releasing mechanism including, in the present instance, a latch, such as 46, adapted for engagement with a projecting finger 47, which is formed on or secured to the top bar 36' of yoke Y, whereby said yoke is retained in position to maintain the feed-spindle 35 and the lever 34 in proper engagement, as shown in Figs. 1 and 3.

The latch 46 may be secured to a rock-shaft 47', which may be oscillated to release said latch from the finger 47, by an arm 48, the lower end of which is connected by a link 49 with a lever 50, pivoted at 51 to the frame, and the free end of which is here so disposed that when the bar-carrier 18 is at the extreme end of its forward stroke and the bar has been sufficiently elongated to push the follower 19 to the limit of its movement in the carrier said follower will engage the end of said lever 50 and move the same sufficiently to trip the latch 46 and thus release the yoke Y, when the spring 42 will operate to move said yoke instantly, and thus not only release the arm 31, but also raise the pawl 38 out of engagement with the ratchet-wheel 37.

As it is desirable to bring the bar-carrier to rest in a position where the justified or elongated bar may be removed therefrom and another bar substituted, means are provided, in the present embodiment of my invention, for automatically stopping the movement of the carrier at that time. This stopping or throw-out mechanism may be organized and constructed in various ways, and in the drawings I have shown a suitable device whereby the carrier-operating means, which in the present case includes the main shaft of the machine, will be disconnected from the driving means, such disconnection taking place preferably at the time when the bar reaches the end of its stroke in one direction—preferably at its starting point—when said bar may be removed from the carrier and another one placed therein.

The stopping device just alluded to consists, in the present case, of a clutch mechanism between the driving-pulley and the main shaft, and it is preferably operated by the movement of the yoke Y after the latter has been released from its retaining-latch.

Any suitable clutch may be employed, the device illustrated in the drawings including a clutch member carried by the pulley 13, and shown as a pin 60, adapted for engaging a member 61, carried by the shaft. The member 61 is substantially in the nature of a ring loosely surrounding the shaft 12 and pivotally supported, as at 61', on a collar 62, fixed on said shaft and having a thrust-pin 62' for assisting to retain said member 61 in place. Near its free end the member 61 is provided with a projection 61'', which is adapted to be engaged, during its revolution, by a cam-face formed on a slide 64, operable in suitable bearings 64' by and upon the release of the yoke Y, above referred to, said slide 64 having a pin 65, in engagement with one arm of an angle-lever 66, which is pivoted at 67, and the other arm of which may be connected by a link, such as 68, with said yoke Y. The slide may also be provided with a suitable stop-face, such as 69, whereby the movement of the shaft 12 may be checked by the projection 61'' engaging said stop-face after the projection 61'' has been withdrawn from its actuator 60 by the cam-face 63, and in opposition to the action of a suitable spring 70, interposed between the member 61 and a suitable collar 62. (See Fig. 2.)

The operation of the machine illustrated in the drawings and adapted for carrying out my invention is substantially as follows:. The several parts of the machine being in the positions shown in Figs. 1 and 3 an unjustified bar is placed in the carrier 18 and rests at one end against the stop-face 18' thereof while it is supported in place in the carrier by the table $t$. Rotary movement is then imparted to the pulley 13 in the direction of the arrow in Fig. 1, said movement resulting in reciprocating the carrier 18 and the bar contained therein between the reducing-rollers 14—15, whereby the cross-section of the bar will be slightly reduced and the bar correspondingly elongated. Toward the return stroke of the carrier the hook-pawl 38 will partially rotate the ratchet-wheel 37, and hence the spindle 35, and thus raise the free end of the lever 31, so that when the carrier has reached the end of its return stroke the reducing-roller 15 will have been slightly advanced or fed toward its companion roller 14. The rollers 14—15 are rotated by contact with the bar moving in either direction, and the feed movement of one roller toward the other, as in the present organization of the machine, is effected on the return stroke of the carrier in order to reduce the bar in an unvarying manner when it travels toward the disengaged or feed-stopping mechanism.

The operation of gradually feeding the reducing-roller toward its companion roller takes place until the bar has been elongated to the required extent—namely, until the follower 19 has been pushed to the limit of its movement in the carrier, when the face 19' thereof will, near the end of the forward movement of the carrier and after the bar has passed between the reducing-rollers for its entire length, strike the lever 50 to disengage the latch 46 from the finger 47 of the yoke Y, which latter will then immediately be swung backward by the spring 42 and until its arm 41 strikes the stop 43. This movement on the part of the yoke Y results in raising the hook-pawl 38 out of engagement with the ratchet-wheel 37 and, furthermore, in disengaging the spindle 35 from the lever 31, which latter will then drop and withdraw the lower roller 15 to afford free passage to the bar during the return stroke of the carrier. Simultaneously with and by the movement of the yoke Y the slide 64 will have been brought into position for disconnecting the shaft 12 from the pulley 13, the relative positions of the various parts of the device being shown in Fig. 6, from which it will be evident that said shaft will be rotated by said pulley for another one-half turn, when the cam-face 63 will engage the clutch member 61'' and thereby withdraw the latter from the actuating member 60, such shaft being brought to a standstill by said member 61'' striking the stop member 69 of the slide 64, this additional one-half rotation of the shaft 12 resulting in returning the carrier with the justified bar to its starting position, as seen in Fig. 1, so that said bar may be removed from the carrier and another unjustified bar substituted. The machine is now again set in operation by returning the yoke Y to its latched position, (shown in Fig. 1,) when the operation of reducing the new bar will be begun.

By the use of the term standardizing type bars, I mean that no matter what size the stock may be, the finished product or bars will all be of substantially one standard size.

Having described my invention, I claim—

1. A machine for lengthening typebars embodying means for extending said bars, and means for limiting their extension actuatable by the extension of such bars.

2. A machine for lengthening type bars embodying bar-extending mechanism and extension-limiting means coöperative with and controlling the operation of said mechanism and actuatable by the extension of the bar.

3. A machine for lengthening type bars embodying bar-reducing roller for extending a bar, and reduction-limiting means coöperative therewith and actuatable by the extension of the bar.

4. In a machine for lengthening type bars, the combination, with a support for a bar, of bar-rolling means for elongating a bar, and extension-limiting means coöperative therewith and effective upon the extension of the bar to a predetermined length.

5. The combination, with a reducing member, of a movable roller coacting therewith for rolling the body of a bar lengthwise to elongate said bar, and means actuatable by the bar for limiting the elongation of the bar.

6. The combination, with a reducing member, of a movable roller coacting therewith for elongating a bar; means for varying the distance between said support and roller;

and means actuatable by the bar for limiting the elongation of the bar.

7. The combination, with a reducing-roller having a fixed axis, of a second reducing-roller coacting with said first reducing-roller to extend a bar and having a movable axis, and extension-limiting means actuatable by the bar and coöperative therewith.

8. The combination, with a reducing-roller having a fixed axis, of a roller having a movable axis and located in position for coacting with said reducing-roller for elongating a bar; means for intermittently feeding the second roller toward the first roller; and means actuatable by the bar for limiting the elongation of the bar.

9. The combination, with a reducing-roller having a fixed axis, of a roller having a movable axis and mounted for coaction with said reducing-roller for elongating a bar; a slide for supporting said second roller; means for intermittently feeding said slide; and means actuatable by the bar for limiting the elongation of the bar.

10. The combination, with a reducing-roller having a fixed axis, of a roller having a movable axis and coacting with said reducing-roller for elongating a bar; a slide for supporting said movable roller; a lever engaging said slide; means for intermittently moving said lever to advance the slide; and means actuatable by the bar for limiting the elongation of the bar.

11. The combination, with a reducing-roller having a fixed axis, of a roller having a movable axis and coacting therewith for elongating a bar; a slide supporting said movable roller; a lever engaging said slide; a worm engaging said lever to advance the slide; and means for limiting the elongation of the bar.

12. The combination, with a reducing-roller having a fixed axis, of a roller having a movable axis and coacting therewith for elongating a bar; a slide supporting said movable roller; a lever engaging said slide; a worm engaging said lever to advance the slide; means for intermittently rotating said worm; and means for limiting the elongation of the bar.

13. In a machine for lengthening type bars a pair of bar-reducing rollers, and means for limiting the reduction of the bar.

14. The combination, with a roller having a fixed axis, of a roller having a movable axis and coacting therewith for elongating a bar; a slide supporting said movable roller; a lever engaging said slide; a worm engaging said lever to advance the slide; worm-rotating means operable upon the passage of the bar between said rollers in one direction; and means for limiting the elongation of the bar.

15. The combination, with a roller having a fixed axis, of a roller having a movable axis and coacting therewith for elongating a bar; a slide for supporting said movable roller; a lever engaging said slide; a worm engaging said lever to advance the slide; a pawl-and-ratchet device adapted to rotate said worm in one direction upon the passage of the bar between said rollers; and means for limiting the elongation of the bar.

16. In a machine for lengthening type bars, the combination, with bar-reducing and with bar carrying means, of means for actuating one of said elements in a working path relative to the other; and reduction-limiting means.

17. In a machine for lengthening type bars, the combination, with bar-reducing means, of a bar-receiving reduction-limiting frame coöperative therewith.

18. In a machine for lengthening type bars, the combination, with bar-reducing members, of a bar-receiving reduction-limiting frame coöperative therewith, and means for passing said frame between said members.

19. In a machine for lengthening type bars, the combination, with a pair of bar-reducing rollers, of a bar-receiving reduction-limiting frame coöperative therewith, and means for reciprocating said frame between said rollers.

20. In a machine for lengthening type bars, the combination, with a bar-carrier and with bar-reducing means coöperative with each other, of mechanism for imparting a traveling movement to one of said members, and a device for stopping said mechanism when the bar is at a predetermined point beyond the reducing means.

21. In a machine for lengthening type bars, the combination, with a bar-carrier and with bar-reducing means coöperative with each other, of mechanism for imparting a traveling movement to one of said members, and a device controlled by said carrier for releasing said mechanism.

22. In a machine for lengthening type bars, the combination, with bar-extending members, of an extension-limiting frame having an opening for receiving the bar, and means for actuating said frame between said extending members.

23. In a machine for lengthening type bars, the combination, with a pair of reducing-rollers and with a carrier-frame movable relatively to and between said rollers and having an opening for receiving a bar, of tables disposed at opposite sides of the reducing-rollers for supporting the bar in the carrier-frame.

24. In a machine for lengthening type bars, the combination, with a pair of reducing-rollers, of a movable bar-receiving carrier, and means for reciprocating said carrier between said rollers.

25. In a machine for lengthening type bars, the combination, with a pair of reducing-rollers, of a movable bar-receiving carrier, and means for reciprocating said carrier between and beyond said rollers.

26. In a machine for lengthening type bars, the combination, with a pair of reducing members for elongating a bar, of a bar-receiving carrier, and a stop supported in the carrier and shiftable relatively thereto by the bar.

27. The combination, with a pair of bar-reducing members, and with means for moving one of said members toward the other, of feeding devices connected for actuating the movable member and comprising a detachable driving connection; a latch adapted for holding said detachable connection in operative position; and means for disengaging the latch.

28. The combination, with a pair of bar-reducing members, and with means for moving one of said members toward the other, of a bar-carrier; means for actuating the bar-carrier; feed mechanism operatively connected to actuate the movable bar-reducing member and comprising a detachable driving connection; a detachable holding device operating to hold the detachable driving connection in operative engagement; and means for shifting said holding device into its inoperative position at a predetermined point in the operation of the mechanism.

29. The combination, with a pair of bar-reducing members and with means for moving one of said members toward the other, of feeding devices connected for actuating the movable member and comprising a detachable driving connection; means for holding said detachable connection in operative position; and a bar-controlled stop for disengaging the holding means.

30. The combination, with a pair of bar-reducing members, and with means for moving one of said members toward the other, of a bar-carrier; means for actuating the bar-carrier; feed mechanism operatively connected to actuate the movable bar-reducing member, and comprising a detachable driving connection; a detachable holding device operating to hold said driving connection in operative engagement; and a bar-controlled stop movable in the carrier for releasing said holding device at a predetermined point in the operation of the mechanism.

31. The combination, with a pair of bar-reducing members and with means for feeding one of said members toward the other, of a tiltable yoke controlling the feeding means, and a latch coöperative with said yoke.

32. The combination, with a pair of bar-reducing members and with means for feeding one of said members toward the other, of a tiltable yoke controlling the feeding means, and a pawl-and-ratchet device carried by the yoke and controlled thereby.

33. The combination, with a pair of bar-lengthening members, of means for feeding one of said members toward the other; a tiltable yoke controlling the feeding means; and a device for releasing said yoke upon the elongation of the bar to a predetermined amount.

34. The combination, with a bar-carrier and with a pair of bar-lengthening members, of mechanism for actuating one of said members in a working path relatively to the other, and a tiltable yoke controlling said mechanism and releasable by the bar upon its elongation to a predetermined amount.

35. The combination, with a pair of bar-lengthening members, of a bar-carrier movable between said members; carrier-operating means; and an automatic device for stopping said operating means upon the elongation of the bar to a predetermined amount.

36. The combination, with bar-lengthening means and with carrier-operating means, of a bar-carrier having a fixed stop-face and also a movable bar-controlled stop operable, on the elongation of the bar, for stopping the carrier-operating means.

37. The combination, with a pair of bar-lengthening members, of a bar-carrier; a movable stop supported in the carrier and shiftable by the bar; means for limiting the movement of said stop; and a device controlled by the conjoint movement of the carrier and stop for stopping the bar-lengthening operation.

38. The combination, with a pair of bar-lengthening members, and with means for feeding one of said members toward the other, of a bar-carrier movable between said members, and a device controlled by the bar for stopping the feeding means.

39. The combination, with a pair of bar-lengthening members, and with means for feeding one of said members toward the other, of a bar-carrier having a fixed stop-face and also a movable bar-controlled stop; means for limiting the movement of said stop; and a device controlled by said stop for stopping the feeding means.

40. The combination, with a pair of bar-lengthening members, and with means for feeding one of said members toward the other, of a bar-carrier having a fixed stop-face and also a movable stop shiftable by the bar; means for limiting the movement of said stop; and a detent releasable by said stop and controlling the feeding means.

41. The combination, with a pair of bar-lengthening members, of a bar-carrier having a fixed stop-face for one end of the bar and also a stop shiftable by the bar; means for limiting the movement of said stop in the carrier; and means for returning said movable stop to its normal position.

42. The combination, with a bar-carrier and with a pair of bar-lengthening members, of means for feeding one of said members toward the other; means for actuating one of said elements in a working path relatively to the other; and means controlled by the bar for stopping the feeding means and for disconnecting the actuating means upon the elongation of the bar to a predetermined amount.

43. The combination, with a pair of bar-lengthening members and with a bar-carrier, of mechanism including a driving-shaft for actuating one of said elements in a working path relatively to the other, and means controlled by the elongated bar for stopping said driving-shaft.

44. The combination, with a pair of bar-lengthening members, a bar-carrier, and mechanism including a driving-shaft and a wheel for imparting movement to the carrier, of a clutch mechanism between the wheel and shaft and controlled by the elongated bar.

45. The combination, with a pair of bar-lengthening members, of a carrier coöperative therewith; carrier-reciprocating mechanism; and means for stopping the movement of said mechanism near the end of a stroke of the carrier.

46. The combination, with a pair of bar-lengthening members, of a carrier coöperating therewith; carrier-reciprocating mechanism; and means for stopping the movement of said mechanism near the end of the return stroke of the carrier.

47. In a machine for lengthening bars, a bar-reciprocator which has a plurality of bar-engaging faces one of which is formed on a stop-member which is actuatable by a bar which is being lengthened.

48. In a machine for lengthening bars, a bar-reciprocator which is engageable with a bar by a stop-member which is actuatable by a bar which is being lengthened.

49. In a machine for lengthening bars, the combination of bar-lengthening members; and a yielding element which pushes a bar in one direction between the bar-lengthening members and yields in the other direction when actuated by a bar which is being lengthened.

50. In a machine for lengthening bars, the combination of bar-lengthening members; and an adjustable yielding element which pushes a bar in one direction between the bar-lengthening members and yields in the other direction when actuated by a bar which is being lengthened.

51. The combination with members operative to lengthen bars; of mechanism automatically operative to limit the functional operation of the lengthening members and actuatable by the bar when it reaches a predetermined length.

52. In a mechanism for lengthening bars, the combination of reducing mechanism and a member which is actuated by the bar, which, when predeterminately lengthened, operates to disengage the lengthening mechanism therefrom.

53. In a machine for longitudinally standardizing bars, co-active bar-lengthening members; means for reciprocating a bar between said members; and means for intermittingly adjusting the bar-lengthening members to cause them to lengthen a bar at each reciprocation of the latter.

54. In a machine for longitudinally standardizing bars, co-active bar-lengthening members, at least one of which is adjustable to affect the resultant of the operation of said members; means for reciprocating a bar between said members; and means for intermittingly adjusting the bar-lengthening members to cause them to lengthen a bar at each reciprocation of the latter.

55. In a machine for longitudinally standardizing bars, co-active bar-lengthening members, means for reciprocating a bar between said members; manipulative means for contacting the bar-lengthening members with a bar; and automatic means for intermittingly adjusting the bar-lengthening members to cause them to lengthen a bar at each reciprocation of the latter.

56. In a machine for longitudinally standardizing bars, co-active bar-lengthening members, at least one of which is adjustable to affect the resultant of the operation of said member; manipulative means for contacting the bar-lengthening members with a bar; and automatic means for intermittingly adjusting the bar-lengthening members to cause them to lengthen a bar at each reciprocation of the latter.

57. The combination with mechanism for justifying a bar, of mechanism for disengaging the justifying mechanism therefrom, said disengaging mechanism being adapted and arranged for operating by means of said bar after justification.

58. The combination with mechanism for justifying a bar, of mechanism for disengaging a portion of the justifying mechanism from the said bar, said disengaging mechanism being operative by means of said bar after a predetermined justification thereof.

59. Mechanism for justifying a bar and embodying means for disengagement with the bar after justification thereof, and means controlled by the justified bar for actuating the same.

60. In combination with mechanism for lengthening typebars, bar-carrying means and bar-reducing means coöperative with each other, of mechanism for imparting a traveling movement to one of said members and a device for stopping said mechanism when the bar is at a predetermined point beyond the reducing means, said device arranged to be actuated by the lengthened typebar.

61. In a machine for lengthening typebars, the combination with a pair of reducing-rollers, of a movable bar-receiving carrier, means for reciprocating said carrier between said rollers, and means actuated by the lengthened bar for limiting the reciprocation of the carrier.

62. The combination with means for lengthening typebars, of means automatically controlled by the lengthened bar for limiting the lengthening operation.

63. In a machine for lengthening typebars, the combination with a pair of bar-reducing rolls, of means controlled by the lengthening of the bar incident to its reduction for limiting the reducing operation.

64. The combination with means for lengthening type bars by rolling, and means automatically controlled by the lengthening of the bar for limiting the rolling.

65. The combination with means for lengthening typebars by rolling, and means controlled by the type bar for limiting the action of the same.

66. In a mechanism for lengthening type bars, the combination of lengthening mechanism, and means constructed and adapted to be automatically thrown into operation upon the type bar reaching a predetermined length to disengage the lengthening mechanism from the bar.

67. In a mechanism for lengthening type bars, the combination of lengthening mechanism, type bar carrying means, and automatic mechanism constructed and adapted to be thrown into operation upon the typebar reaching a predetermined length for disengaging the lengthening mechanism from the type bar.

68. In a mechanism for lengthening type bars, the combination of lengthening mechanism, type bar carrying means, and mechanism constructed and adapted to be automatically thrown into operation by the bar carrying means upon the type bar reaching a predetermined length for disengaging the lengthening mechanism from the type bar.

FRANCIS H. RICHARDS.

Witnesses:
C. A. WEED,
CHARLES F. SCHMELZ.